US012741914B2

(12) United States Patent
Young et al.

(10) Patent No.: US 12,741,914 B2
(45) Date of Patent: Sep. 22, 2026

(54) SYSTEM AND METHOD FOR FORMING A CERAMIC SANDWICH-STRUCTURED COMPOSITE COMPONENT

(71) Applicant: General Electric Company, Schenectady, NY (US)

(72) Inventors: Ryan Marcus Young, West Chester, OH (US); Nathan Carl Sizemore, Hamilton, OH (US); Wayne Allen Brown, Blue Ash, OH (US)

(73) Assignee: General Electric Company, Evendale, OH (US)

( * ) Notice: Subject to any disclaimer, the term of this patent is extended or adjusted under 35 U.S.C. 154(b) by 207 days.

(21) Appl. No.: 18/661,853

(22) Filed: May 13, 2024

(65) Prior Publication Data

US 2025/0346536 A1 Nov. 13, 2025

(51) Int. Cl.
*B29C 44/46* (2006.01)
*B29C 33/48* (2006.01)
(Continued)

(52) U.S. Cl.
CPC ............ *C04B 38/02* (2013.01); *B29C 33/485* (2013.01); *B29C 44/1228* (2013.01); *B29C 44/129* (2013.01); *B29C 44/3415* (2013.01); *B29C 44/583* (2013.01); *C04B 38/0003* (2013.01); *C04B 38/0006* (2013.01); *C04B 38/106* (2013.01); *C04B 41/0072* (2013.01); *C04B 2235/602* (2013.01); *C04B 2235/6028* (2013.01); *C04B 2235/661* (2013.01); *C04B 2235/9607* (2013.01); *C04B 2237/02* (2013.01); *C04B 2237/04* (2013.01)

(58) Field of Classification Search
CPC . B29C 33/485; B29C 44/1228; B29C 44/129; B29C 44/3415; B29C 44/46; B29C 44/58; B29C 44/583; B29C 65/02; B29C 70/30; C04B 35/64; C04B 38/0003; C04B 38/0006; C04B 38/02; C04B 38/106; C04B 41/0072; C04B 2235/602; C04B 2235/6028; C04B 2235/661; C04B 2237/02; C04B 2237/04
USPC ...... 264/43, 46.4, 51, 53, 54, 313, 629, 630, 264/642, 654; 425/383, 500, 501, 508
See application file for complete search history.

(56) References Cited

U.S. PATENT DOCUMENTS 5,582,784 A 12/1996 Daws
6,616,971 B2 9/2003 Evans
(Continued)

*Primary Examiner* — Leo B Tentoni
(74) *Attorney, Agent, or Firm* — Dority & Manning, P.A.

(57) ABSTRACT

A method for forming a ceramic sandwich-structured composite component includes applying one or more ceramic matrix composite (CMC) plies to a surface of a tool, and positioning a ceramic foam precursor with respect to the tool such that the ceramic foam precursor and the one or more CMC plies is disposed in a sealed interior cavity of the tool. The ceramic foam precursor and the one or more CMC plies are cured within the sealed interior cavity to form a green preform such that the ceramic foam precursor expands within the sealed interior cavity to apply a pressure to the one or more CMC plies to consolidate the one or more CMC plies. The expanded ceramic foam precursor forms a ceramic core of the green preform bonded to the one or more CMC plies. The green preform is removed from the tool and sintered to ceramify the green preform.

20 Claims, 5 Drawing Sheets

(51) Int. Cl.

| | |
|---|---|
| ***B29C 44/12*** | (2006.01) |
| ***B29C 44/34*** | (2006.01) |
| ***B29C 44/58*** | (2006.01) |
| ***B29C 65/02*** | (2006.01) |
| ***B29C 70/30*** | (2006.01) |
| ***C04B 35/64*** | (2006.01) |
| ***C04B 38/00*** | (2006.01) |
| ***C04B 38/02*** | (2006.01) |
| ***C04B 38/10*** | (2006.01) |
| ***C04B 41/00*** | (2006.01) |

(56) References Cited

U.S. PATENT DOCUMENTS

| | | | | |
|---|---|---|---|---|
| 7,823,529 | B2 | 11/2010 | Mack et al. | |
| 8,087,719 | B2 | 1/2012 | Caliskan et al. | |
| 9,434,142 | B2 | 9/2016 | Levit et al. | |
| 9,597,826 | B2 | 3/2017 | Mishra et al. | |
| 9,663,404 | B2 | 5/2017 | de Diego et al. | |
| 9,855,711 | B2 | 1/2018 | Passmann et al. | |
| 10,563,522 | B2 | 2/2020 | Thomas et al. | |
| 2009/0004425 | A1 | 1/2009 | Lehman et al. | |
| 2011/0293914 | A1 | 12/2011 | Maurer et al. | |
| 2012/0266603 | A1* | 10/2012 | Uskert | B32B 5/26<br>156/60 |
| 2013/0084189 | A1* | 4/2013 | Diego | C04B 37/005<br>416/241 B |
| 2016/0264476 | A1* | 9/2016 | Keith | C04B 35/76 |
| 2018/0135556 | A1* | 5/2018 | Todorovic | F02K 1/48 |

* cited by examiner

SYSTEM AND METHOD FOR FORMING A CERAMIC SANDWICH-STRUCTURED COMPOSITE COMPONENT

FIELD

The present subject matter relates generally to a method for forming a ceramic sandwich-structured composite component.

BACKGROUND

Reinforced ceramic matrix composites ("CMCs") having fibers dispersed in continuous ceramic matrices of the same or a different composition are well suited for structural applications because of their toughness, thermal resistance, high-temperature strength, and chemical stability. Such CMCs typically have a high strength-to-weight ratio that renders them attractive in applications in which weight is a concern, such as in aeronautic applications. Sandwich-structured composite components with internal cellular structures such as honeycomb or a similar configuration of cells can provide for similar properties while reducing a weight of the component. A ceramic sandwich-structured composite component may include an internal ceramic cellular structure between oppositely disposed CMC facesheets. A ceramic sandwich-structured composite component is also particularly suitable for higher temperature applications. The ceramic core materials are also lightweight compared to superalloys, yet can still provide strength and durability to the component made therefrom.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
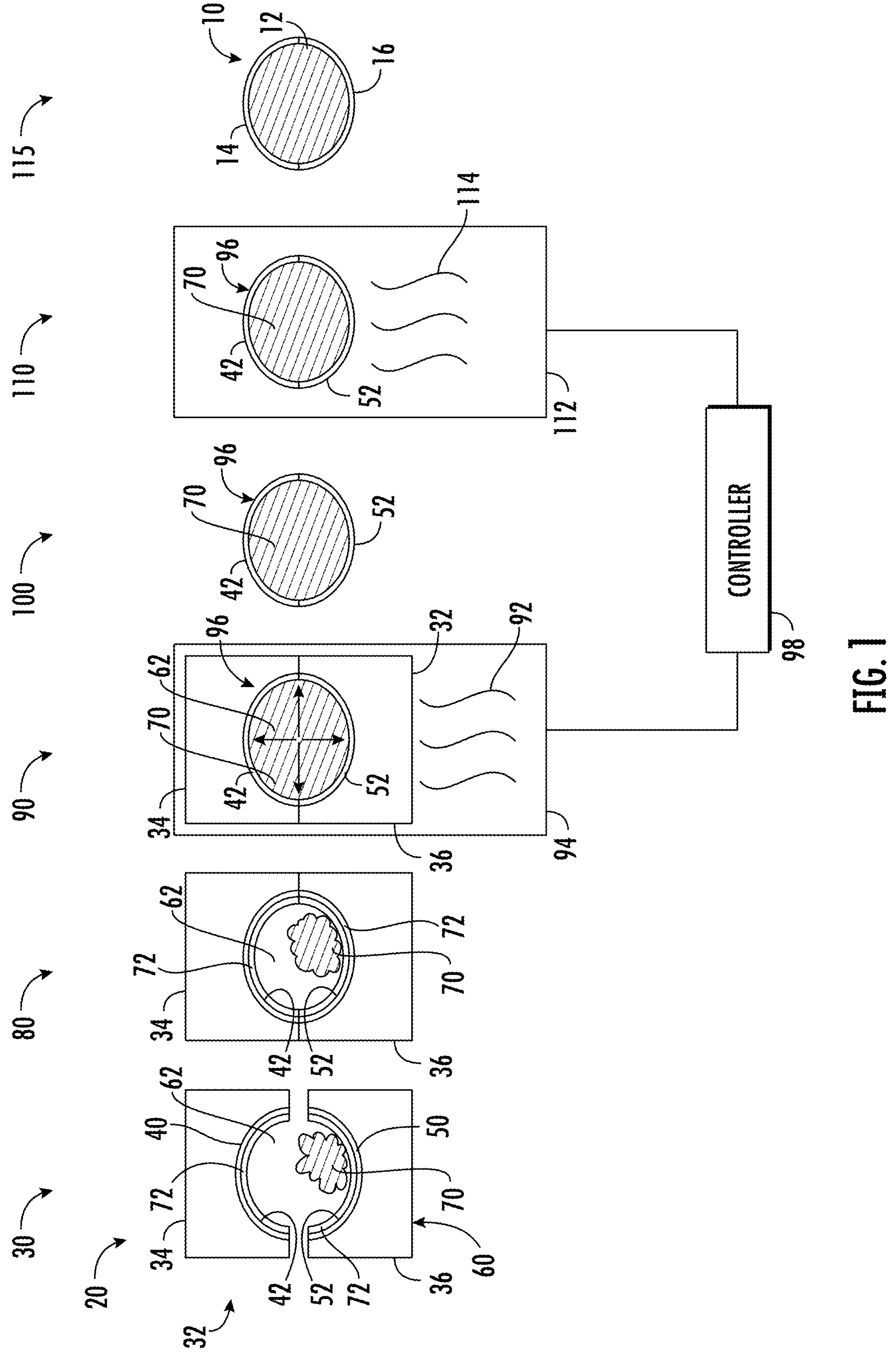
FIG. 1 is a schematic, view of an exemplary system used in a method for forming a ceramic sandwich-structured composite component in accordance with an embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The phrases "from X to Y" and "between X and Y" each refers to a range of values inclusive of the endpoints (i.e., refers to a range of values that includes both X and Y).

The singular forms "a", "an", and "the" include plural references unless the context clearly dictates otherwise.

In the present disclosure, when a layer is being described as "above one another," "on," or "over" another layer or substrate, it is to be understood that the layers can be directly contacting each other. Thus, these terms are simply describing the relative position of the layers to each other and do not necessarily mean "on top of" since the relative position above or below depends upon the orientation of the device to the viewer.

As used herein a "monolithic" ceramic refers to a ceramic material that does not contain any reinforcement fibers.

A "green ceramic material" is a ceramic material that is only partially processed to remove solvents, crosslink polymeric elements, or both, at an intermediate temperature. This partial processing allows for the creation of a dimensionally stable preceramic preform.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof. Those fibers can be continuous fibers or short fibers like whiskers.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or pyrolysis/burn-out to yield a high char residue in the preform, and subsequent chemical processing, such as melt-infiltration with, for example, silicon or a silicon alloy, to arrive at a component formed of a CMC material having a desired chemical composition. Chemical vapor infiltration (CVI) may also be used to fabricate the preform such that a gaseous source of silicon, silicon carbide, or a silicon alloy is used to infiltrate pores of the cured preform to arrive at a component formed of a CMC material having a desired chemical composition. Other methods may also be used to form the preform component such as, by way of non-limiting example, polymer infiltration and pyrolysis (PIP).

In exemplary embodiments, the present disclosure includes a ceramic sandwich-structured composite component having a core structure with plurality of "internal structures" such as hollow cells, channels, struts, lattice structures, cavities and other structural and/or functional elements. While ceramic composite materials provide good toughness, high thermal insulation, high-temperature strength, and chemical stability in a broad range of operating environments, the raw material and processing techniques can become expensive. Current structures capable of withstanding extreme operation conditions may be bulky, expensive, or have short lifespans. Accordingly, lighter, stronger, and more cost-effective structures are highly desirable in the art and can enable a broader range of applications. Ceramic sandwich-structured composite components with internal cellular structures such as honeycomb or similar configuration of cells can provide for similar properties while reducing weight of the component, and notably, the amount of CMC material used in the component. However, the relatively thin walls of the core structure provide limited bonding area to connect the core structure with one or more facesheets. The internal structures may comprise ceramic components or structures (e.g., a ceramic core including a solid ceramic core or a ceramic core including a cellular structure, such as a foam or honeycomb structure) that, in combination with CMC plies, may form a ceramic sandwich-structured composite component. A ceramic sandwich-structured composite component is also particularly suitable for higher temperature applications. A ceramic sandwich-structured composite component may comprise a ceramic core (i.e., a ceramic material without a reinforcing material) between oppositely disposed CMC facesheets. The ceramic core materials are also lightweight compared to superalloys, yet can still provide strength and durability to the component made therefrom. Therefore, such materials are usable for many gas turbine components used in higher temperature sections of gas turbine engines, such as airfoils (e.g., turbines, and vanes), combustors, shrouds and other like components, nozzles, transition ducts, thermal protection systems (TPS), aerodynamic control surfaces and leading edges that would benefit from the lighter-weight and higher temperature capability these materials can offer.

Embodiments of the present disclosure provide a ceramic sandwich-structured composite component suitable for high-temperature, high-specific-stiffness, applications. In exemplary embodiments, the present disclosure provides a method for forming a ceramic sandwich-structured composite component that has a ceramic foam core formed in-situ during a co-bonding and co-curing process with the CMC plies forming the CMC facesheets. Embodiments of the present disclosure include the layup of a preceramic CMC laminate within a closable or scalable geometry tool. A chemically- or thermally-activated ceramic foam precursor is placed in the sealed cavity formed by the closable tool. A curing process activates the ceramic foam precursor via chemical reaction or at low temperature, and the ceramic foam precursor expands to fill the cavity. The expanding ceramic foam precursor creates and applies pressure to consolidate the CMC laminate, allowing for co-curing of the ceramic foam and CMC laminate at a low temperature to a green state to form a green preform. The cured green preform is removed from the tooling and sintered at high temperature to ceramify the entire structure. Embodiments of the present disclosure simplify the manufacturing process of advanced ceramic structures by reducing the number of processing, machining, and thermal cycle steps in the fabrication of the ceramic sandwich-structured composite component, reducing the time and cost to fabricate the ceramic sandwich-structured composite component. Embodiments of the present disclosure use the expanding ceramic foam to generate a sufficient compaction within the tool to consolidate the CMC laminate without the need for an autoclave typically used to provide the compaction pressure.

Referring now to the drawings, wherein identical numerals indicate the same elements throughout the figures, FIG. 1 is a schematic diagram depicting a method for forming a ceramic sandwich-structured composite component 10 in accordance with an embodiment of the present disclosure. In the illustrated embodiment, at least a portion of the ceramic sandwich-structured composite component 10 includes a ceramic core 12 sandwiched or disposed between a pair of CMC facesheets 14 and 16. In other words, the ceramic sandwich-structured composite component 10 includes the ceramic core 12 with a layup or stacked arrangement of one or more CMC plies forming each of the CMC facesheets 14 and 16. In FIG. 1, the ceramic sandwich-structured composite component 10 is depicted having a non-planar geometry, and the CMC facesheets 14 and 16 are depicted as, together, encircling or circumscribing the ceramic core 12 (e.g., at least a portion of the CMC facesheet 14 abutting at least a portion of the CMC facesheet 16). However, it should be understood that the ceramic sandwich-structured composite component 10 may have other geometries such as, by way of non-limiting example, a planar geometry such that the CMC facesheets 14 and 16 are disposed in a spaced apart relationship with respect to each other. Thus, the ceramic sandwich-structured composite component 10 is a layered structure formed by two CMC facesheets 14 and 16 bonded to the ceramic core 12. However, it should be understood that embodiments of the present disclosure may be used to form a ceramic sandwich-structured composite component having a single CMC facesheet bonded to a ceramic core.

In FIG. 1, a system 20 is used in a process for forming the ceramic sandwich-structured composite component 10. In a stage 30 of the process for forming the ceramic sandwich-structured composite component 10, the system 20 includes a tool 32 including portions 34 and 36. The portion 34 may be referred to as a top portion 34, and the portion 36 may be referred to as a bottom portion 36. The tool 32 may include any type of material or structure constituting a mold for forming the ceramic sandwich-structured composite component 10 such that the tool 32 may have a particular shape or contour corresponding to a particular shape or contour desired for the formed ceramic sandwich-structured composite component 10. It should be understood that the tool 32 may include a greater or fewer quantity of portions or individual tool segments that may be secured together.

In the illustrated embodiment, the top portion 34 defines a surface 40 against which one or more CMC plies 42 are applied. The one or more CMC plies 42 may include pre-impregnated, or prepreg, CMC laminate layers before drying or sintering such that the one or more CMC plies 42 conform to the surface 40 of the top portion 34. In the illustrated embodiment, the surface 40 is a curved surface; however, it should be understood that the surface 40 may be any shape or contour, including having planar and non-planar portions. In the illustrated embodiment, the surface 40 is facing the bottom portion 36 such that the one or more CMC plies 42 are also facing the bottom portion 36.

In FIG. 1, the bottom portion 36 also defines a surface 50 against which one or more CMC plies 52 are applied. The one or more CMC plies 52 may include one or more pre-impregnated, or prepreg, CMC laminate layers, similar to the CMC plies 42, before drying or sintering such that the one or more CMC plies 52 conform to the surface 50 of the bottom portion 36. In the illustrated embodiment, the surface 50 is a curved surface; however, it should be understood that the surface 50 may be any shape or contour, including having planar and non-planar portions. In the illustrated embodiment, the surface 50 is facing the top portion 34 such that the one or more CMC plies 52 are also facing the top portion 34.

In the illustrated embodiment, the top portion 34 and the bottom portion 36 are configured to define an enclosure 60 such that the top portion 34 and the bottom portion 34 may be closed, brought together, or secured to each other to define an interior cavity 62. Thus, in the illustrated embodiment, the surfaces 40 and 50 each define surfaces disposed within the interior cavity 62 when the top portion 34 and the bottom portion 36 are secured to each other. Correspondingly, the CMC plies 42 and 52 are also disposed within the interior cavity 62 when the top portion 34 and the bottom portion 36 are secured to each other.

At the stage 30, a ceramic foam precursor 70 is positioned with respect to the tool 32 such that the ceramic foam precursor 70 is also disposed within the interior cavity 62 when the top portion 34 and the bottom portion 36 are secured to each other. The ceramic foam precursor 70 may include a pre-ceramic resin that foams, such as by chemical reaction, by thermal processing by the application of heat, or any combination of the foregoing. Thus, in exemplary embodiments, the ceramic foam precursor 70 may self-foam based on a chemical reaction of the constituent components forming the ceramic foam precursor 70 without the application of heat. In exemplary embodiments, a ceramic adhesive layer 72 may be applied to one or more of the CMC plies 42 or 52. For example, the ceramic adhesive layer 72 may include silicon or a silicon alloy, silicon carbide powder, and carbon constituents such as carbon powders or carbon char, or carbon precursor like phenolic resin or furfuryl-alcohol resin, pore former and binder. The ceramic adhesive layer 72 can be a slurry in a liquid form and applied by a technique like brushing, spin coating, or spraying, for example, or in a shaped form such as in a form of tape partially dried. The tape can be formed by a technique such as tape casting and, after partial or total drying, some sections of the tape can be cut to the desired shapes before placing onto a bond line, such as a surface of one or more of the CMC plies 42 or 52. In exemplary embodiments, the slurry is cast onto a carbon matrix veil that provides better mechanical strength of the tape and facilitates the handling of the tape. The slurry casted onto a carbon matrix veil is called a matrix tape or matrix ply.

At a stage 80 subsequent to the stage 30, the top portion 34 and the bottom portion 36 are closed or otherwise brought or secured together to seal the interior cavity 62. In other words, the interior cavity 62 is sealed to form a sealed interior cavity, or environment, containing the CMC plies 42 and 52 and the ceramic foam precursor 70, and also the ceramic adhesive layer 72 if used. Thus, in exemplary embodiments, when the top portion 34 and the bottom portion 36 are closed or otherwise brought or secured together to seal the interior cavity 62, the surfaces 40 and 50 are interior surfaces within the interior cavity 62. In the illustrated embodiment, the ceramic foam precursor 70 is positioned within the interior cavity 62 such that the ceramic foam precursor 70 may be disposed proximate to or in contact with the CMC plies 52. However, it should be understood that the ceramic sandwich-structured composite component 10 may also include only a single CMC facesheet such that the CMC plies 42 or the CMC plies 52 may be omitted. In such an embodiment, for example, if the CMC plies 52 were omitted, the ceramic foam precursor 70 may be positioned in contact with the tool 32, such as against or in contact with the surface 50 of the bottom portion 36.

At a stage 90 subsequent to the stage 80, the ceramic foam precursor 70 expands by chemical reaction, by applied heat 92, or any of the foregoing, individually or in combination. In exemplary embodiments, the tool 32 may be placed within an oven 94 such that the tool 32 is exposed to heat 92 via the oven 94. The oven 94 may be any type of device capable of providing thermal energy. In exemplary embodiments, the oven 94 heats the tool 32, and the ceramic foam precursor 70 and the CMC plies 42 and 52, and also the ceramic adhesive layer 72 if used, to approximately 400° F. to co-cure the ceramic foam precursor 70 and the CMC plies 42 and 52, and also the ceramic adhesive layer 72 if used. In exemplary embodiments, the ceramic foam precursor 70 and the CMC plies 42 and 52 are heated to between 400° F. and 450° F. However, it should be understood that the thermal processing of the ceramic foam precursor 70 and the CMC plies 42 and 52, and also the ceramic adhesive layer 72 if used, may include other temperatures or temperature ranges based on the material or chemical composition of the ceramic foam precursor 70 and the CMC plies 42 and 52. In the illustrated embodiment, the system 20 may include a controller 98 coupled to the oven 94. Actuation or control of the oven 94 may be automatically controlled, such as by the controller 98, to control the heat 92 applied to the tool 32, the ceramic foam precursor 70 and the CMC plies 42 and 52, and also the ceramic adhesive layer 72 if used, to co-cure the ceramic foam precursor 70 and the CMC plies 42 and 52, and also the ceramic adhesive layer 72 if used. The controller 98 may be configured similarly to exemplary computing devices of the computing system 300 described below with reference to FIG. 5.

In exemplary embodiments, the ceramic foam precursor 70 expands within the interior cavity 62 and applies a pressure to the one or more CMC plies 42 and 52 to consolidate the CMC plies 42 and 52. The expansion of the ceramic foam precursor 70 within the interior cavity 62 consolidates the CMC plies 42 and 52 and advances the ceramic foam precursor 70 and the CMC plies 42 and 52, and also the ceramic adhesive layer 72 if used, to a green state to form a green preform 96. In exemplary embodiments, a quantity or volume of the ceramic foam precursor 70 is selected based on its expansion properties, the volume of the interior cavity 62 to be filled, and the amount of pressure desired to be applied to the CMC plies 42 and 52, or any combination of the foregoing. In exemplary embodiments, a quantity or volume of the ceramic foam precursor 70 is selected such that the ceramic foam precursor 70 expands to fill the interior cavity 62 and apply an equalized pressure, defined pressure, or both, across a surface area of the CMC plies 42 and 52 to consolidate the CMC plies 42 and 52. In exemplary embodiments, a quantity or volume or type of the ceramic foam precursor 70 is selected such that the ceramic foam precursor 70 has a defined density when expanded based on a geometry of the sealed interior cavity 62.

At a stage 100 subsequent to the stage 90, the tool 32 is removed from the green preform 96. At a stage 110 subsequent to the stage 100, the green preform 96 is thermally processed to sinter the green preform 96 using a thermal cycle based on a chemical composition of the ceramic foam precursor 70 and material of the CMC plies 42 and 52 to ceramify the green preform 96 and form the ceramic sandwich-structured composite component 10. In exemplary embodiments, the green preform 96 may be placed in a sintering unit 112 such as, by way of non-limiting examples, a furnace, oven, kiln, or other typical device used for a sintering process, such that heat 114 is applied by the sintering unit 112 to sinter the green preform 96. In exemplary embodiments, the green preform 96 may be sintered at a high temperature such as, by way of non-limiting example, greater than 1800° F. to ceramify the green preform 96. The controller 98 may be coupled to the sintering unit 112. Actuation or control of the sintering unit 112 may be automatically controlled, such as by the controller 98, to control the temperature of the sintering process. At a stage 115 subsequent to the stage 110, the ceramified ceramic sandwich-structured composite component 10 is removed from the sintering unit 112 and may be further processed. In exemplary embodiments, the expanded and sintered ceramic foam precursor 70 forms the ceramic core 12 bonded to the CMC plies 42 and 52 which form the respective CMC facesheets 14 and 16.

In exemplary embodiments, the ceramic foam precursor 70 and the CMC plies 42 and 52 are selected such that the coefficient of thermal expansion (CTE) parameter between the ceramic foam precursor 70 and the CMC plies 42 and 52 after being processed to the green state is the same or substantially the same. In exemplary embodiments, the ceramic foam precursor 70 and the CMC plies 42 and 52 are selected such that their CTE parameters after being processed to the green state are the same or substantially the same to ensure the expanded ceramic foam precursor 70 remains bonded to the CMC plies 42 and 52 during the sintering process at the stage 110. In exemplary embodiments, the ceramic foam precursor 70 and the CMC plies 42 and 52 are selected such that a difference in their CTE parameters is less than 1.1e-6 in/in/° F.

Figures 2A, 2B, 2C:
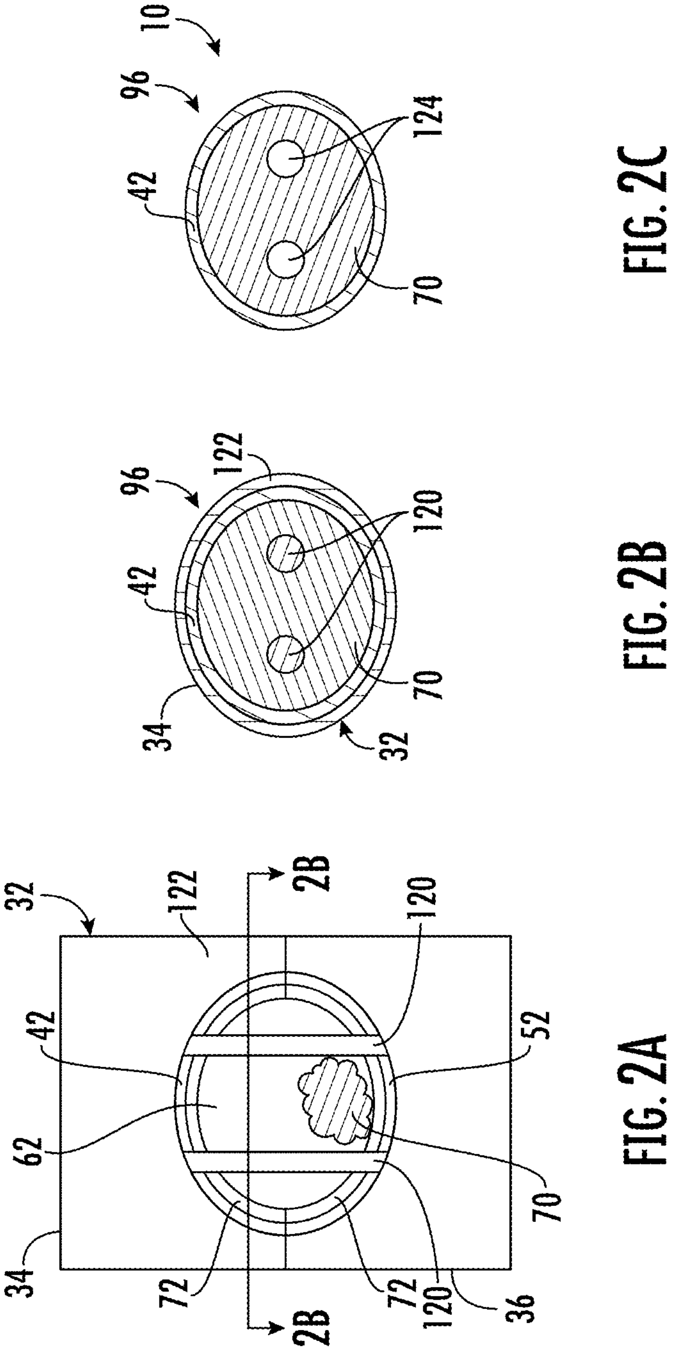
FIG. 2A is a schematic, side view of the exemplary system for forming the ceramic sandwich-structured composite component in accordance with the present disclosure.
FIG. 2B is a schematic, section view of the exemplary system for forming the ceramic sandwich-structured composite component of FIG. 2A taken along the line 2B-2B of FIG. 2A in accordance with the present disclosure.
FIG. 2C is a schematic, section view of the ceramic sandwich-structured composite component formed using the exemplary system of FIGS. 2A and 2B in accordance with the present disclosure.

FIG. 2A is a schematic diagram depicting the exemplary tool 32 for forming the ceramic sandwich-structured composite component 10 in accordance with an embodiment of the present disclosure, and FIG. 2B is a schematic diagram depicting a section view of a portion of the tool 32 of FIG. 2A and the ceramic foam precursor 70 of the ceramic sandwich-structured composite component 10 taken along the line 2B-2B of FIG. 2A. Based on the section view of FIG. 2B, only the top portion 34 of the tool 32 and the CMC plies 42 are depicted in FIG. 2B. In the illustrated embodiment, the tool 32 includes one or more mandrels 120 that extend at least partially through or are at least partially disposed within at least a portion of the interior cavity 62. The one or more mandrels 120 may have any shape, thickness, orientation, or geometric configuration. The one or more mandrels 120 may be separate structures inserted into or coupled to at least one of the portions 34 or 36 of the tool 32 or may be formed as part of one or both of the portions 34 and 36 of the tool 32. The one or more mandrels 120 are configured to occupy at least a portion of the interior cavity 62 such that the ceramic foam precursor 70 expands around the one or more mandrels 120. In other words, the one or more mandrels 120 are positioned to prevent expansion of the ceramic foam precursor 70 into one or volumes or spaces within the interior cavity 62. Although the one or more mandrels 120 in FIGS. 2A and 2B are depicted spaced apart from each other, it should be understood that the one or more mandrels 120 may be located elsewhere such that the one or more mandrels 120 occupy at least a portion of the interior cavity 62. In exemplary embodiments, the CMC plies 42 and 52 may be laid up or applied to the tool 32 to surround, abut, or terminate in close proximity to the one or more mandrels 120. In FIG. 2A, the ceramic foam precursor 70 is disposed within at least a portion of the interior cavity 62, and in FIG. 2B, the ceramic foam precursor 70 is depicted in an expanded state, such as after the stage 90 of FIG. 1. As depicted in FIG. 2B, the ceramic foam precursor 70 expands within the interior cavity 62 and around the one or more mandrels 120 to form the green preform 96.

FIG. 2C schematically depicts the green preform 96 of FIG. 2B after removal of the tool 32 (FIGS. 2A and 2B) and the one or more mandrels 120 (FIGS. 2A and 2B) from the green preform 96. As depicted in FIG. 2C, the placement and subsequent removal the one or more mandrels 120 (FIGS. 2A and 2B) forms one or more cavities 124 in the green preform 96. In the embodiment illustrated in FIGS. 2A-2C, the ceramic foam precursor 70 is depicted as expanding to a state where the expanded ceramic foam precursor 70 is in contact with the one or more mandrels 120 such that, after removal of the one or more mandrels 120, the one or more cavities 124 are hollow portions within the green preform 96 (i.e., resulting in hollow cavities formed in the ceramic core 12 after sintering, such as after the stage 110 (FIG. 1)). However, it should be understood that one or more CMC plies may also be applied or laid up against the one or more mandrels 120 such that the resulting one or more cavities 124 are lined with the consolidated CMC plies (i.e., similar to the CMC plies 42 or 52 (FIG. 1)).

Figure 3:
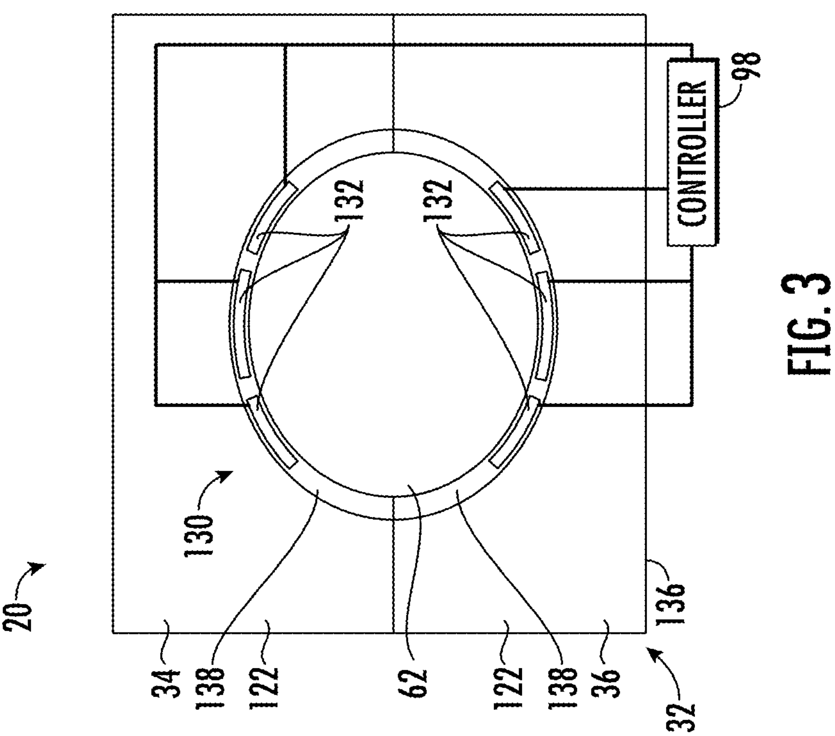
FIG. 3 is a schematic, side view of an exemplary system for forming a ceramic sandwich-structured composite component in accordance with an embodiment of the present disclosure.

FIG. 3 is a schematic diagram depicting the exemplary tool 32 according to embodiments of the present disclosure. In the illustrated embodiment, the system 20 includes a thermal energy system 130 for providing thermal energy to co-cure the ceramic foam precursor 70 (FIGS. 1 and 2A-2C) and the CMC plies 42 and 52 (FIGS. 1 and 2A-2C). In the illustrated embodiment, the thermal energy system 130 includes one or more heating elements 132 for providing or distributing thermal energy to co-cure the ceramic foam precursor 70 (FIGS. 1 and 2A-2C) and the CMC plies 42 and 52 (FIGS. 1 and 2A-2C), such as in the stage 90 (FIG. 1). In exemplary embodiments, the one or more heating elements 132 are electric heating elements. The one or more heating elements 132 may be placed at particular locations with respect to the tool 32 to provide a defined thermal profile to the ceramic foam precursor 70 (FIGS. 1 and 2A-2C) and the CMC plies 42 and 52 (FIGS. 1 and 2A-2C). For example, the tool 32 may have different thicknesses of its walls 122, the interior cavity 62 may have different geometric aspects, or any combination of the foregoing, such that a defined thermal profile is needed to co-cure the ceramic foam precursor 70 (FIGS. 1 and 2A-2C) and the CMC plies 42 and 52 (FIGS. 1 and 2A-2C) and cause the foam precursor 70 to expand to fill or substantially fill the interior cavity 62. For example, if the walls 122 of the tool 32 have different thicknesses at different locations, heat applied to an exterior surface 136 of the tool 32, such as at the stage 90 of FIG. 1, may produce a non-uniform thermal energy distribution within the interior cavity 62. In the illustrated embodiment, the system 20 may include the controller 98 coupled to the one or more heating elements 132. Actuation or control of the one or more heating elements 132 may be automatically controlled, such as by the controller 98, to individually control the one or more heating elements 132. Thus, in exemplary embodiments, the one or more heating elements 132 may be individually controlled by the controller 98 such that particular heating elements 132 may be controlled to emit a greater or lesser amount of thermal energy than other heating elements 132 to provide a defined amount of thermal energy, or a defined thermal energy profile, to various portions of the tool 32 and to the ceramic foam precursor 70 (FIGS. 1 and 2A-2C) and the CMC plies 42 and 52 (FIGS. 1 and 2A-2C) to co-cure the ceramic foam precursor 70 (FIGS. 1 and 2A-2C) and the CMC plies 42 and 52 (FIGS. 1 and 2A-2C). In the illustrated embodiment, the one or more heating elements 132 are depicted as being embedded within one or more walls 138 of the tool 32. However, it should be understood that the one or more heating elements 132 may be otherwise positioned or coupled to the tool 32 such as, by way of non-limiting example, coupled to the exterior surface 136 of the tool 32 or disposed in spaced apart relationship to the exterior surface 136 of the tool 32. The one or more walls 138 of the tool 32 containing the one or more heating elements 132 may be removable from the tool 32 to accommodate replacement or re-positioning of the one or more heating elements 132 with respect to the interior cavity 62.

Figure 4:
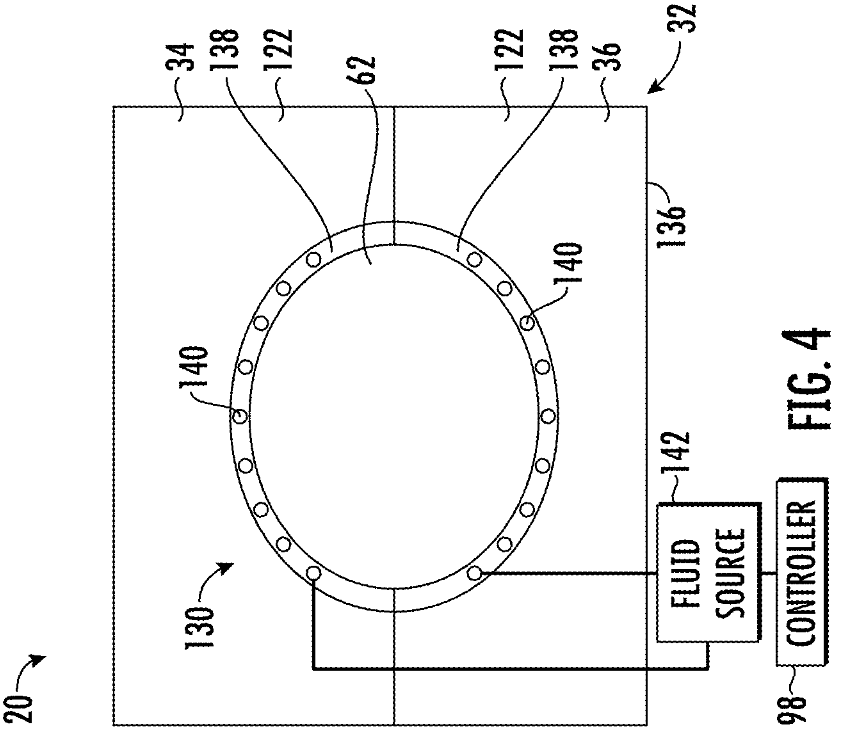
FIG. 4 is a schematic, side view of an exemplary system for forming a ceramic sandwich-structured composite component in accordance with another embodiment of the present disclosure.

FIG. 4 is a schematic diagram depicting the exemplary tool 32 according to another embodiment of the present disclosure. In the illustrated embodiment, the thermal energy system 130 includes one or more flow channels 140 extending or disposed within the one or more walls 138 of the tool 32. The one or more flow channels 140 may be fluidically coupled to one or more fluid sources 142. The one or more fluid sources 142 are actuatable to provide or distribute a flow of fluid, in particular, a flow of heated fluid, through the one or more flow channels 140 to provide a defined thermal profile to the ceramic foam precursor 70 (FIGS. 1 and 2A-2C) and the CMC plies 42 and 52 (FIGS. 1 and 2A-2C) for co-curing the ceramic foam precursor 70 (FIGS. 1 and 2A-2C) and the CMC plies 42 and 52 (FIGS. 1 and 2A-2C), such as in the stage 90 (FIG. 1). The one or more flow channels 140 may be located with respect to the tool 32 to provide a defined thermal profile for various portions of the tool 32 to accommodate different thicknesses of the walls 122, different geometric aspects of the interior cavity 62, or any combination of the foregoing, such that a defined thermal profile is provided to co-cure the ceramic foam precursor 70 (FIGS. 1 and 2A-2C) and the CMC plies 42 and 52 (FIGS. 1 and 2A-2C). The temperature, flow rate, or other characteristics of the fluid flowing through the one or more flow channels 140 may be controlled such that particular portions of the tool 32 receive greater amounts of thermal energy than other portions of the tool 32. Thus, embodiments of the present disclosure enable a defined thermal profile to be input to the ceramic foam precursor 70 (FIGS. 1 and 2A-2C) and the CMC plies 42 and 52 (FIGS. 1 and 2A-2C) to co-cure the ceramic foam precursor 70 (FIGS. 1 and 2A-2C) and the CMC plies 42 and 52 (FIGS. 1 and 2A-2C), such as in the stage 90 (FIG. 1). The one or more flow channels 140 may form part of a single fluid flow circuit or certain ones of the one or more flow channels 140 may form separate fluid flow circuits that are independently controllable.

Figure 5:
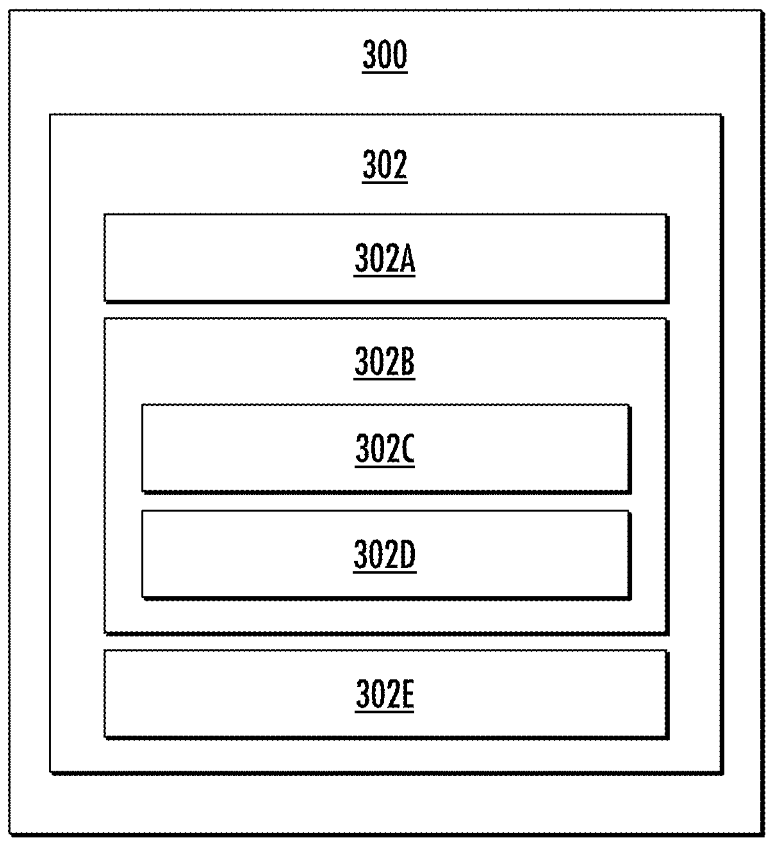
FIG. 5 is a block diagram depicting an example computing system according to example embodiments of the present disclosure.

FIG. 5 provides an example computing system 300 according to example embodiments of the present disclosure. The computing devices or elements described herein, such as the controller 98, may include various components and perform various functions of the computing system 300 described below, for example.

As shown in FIG. 5, the computing system 300 can include one or more computing device(s) 302. The computing device(s) 302 can include one or more processor(s) 302A and one or more memory device(s) 302B. The one or more processor(s) 302A can include any suitable processing device, such as a microprocessor, microcontroller, integrated circuit, logic device, and/or other suitable processing device. The one or more memory device(s) 302B can include one or more computer-executable or computer-readable media, including, but not limited to, non-transitory computer-readable media, RAM, ROM, hard drives, flash drives, and/or other memory devices.

The one or more memory device(s) 302B can store information accessible by the one or more processor(s) 302A, including computer-readable instructions 302C that can be executed by the one or more processor(s) 302A. The instructions 302C can be any set of instructions that when executed by the one or more processor(s) 302A, cause the one or more processor(s) 302A to perform operations. In some embodiments, the instructions 302C can be executed by the one or more processor(s) 302A to cause the one or more processor(s) 302A to perform operations, such as any of the operations and functions for which the computing system 300 and/or the computing device(s) 302 are configured, such as controlling operation or actuation of the one or more heating elements 132, the one or more fluid sources 142, or other components of the system 20. The instructions 302C can be software written in any suitable programming language or can be implemented in hardware. Additionally, and/or alternatively, the instructions 302C can be executed in logically and/or virtually separate threads on processor(s) 302A. The memory device(s) 302B can further store data 302D that can be accessed by the processor(s) 302A. For example, the data 302D can include models, lookup tables, databases, etc.

The computing device(s) 302 can also include a network interface 302E used to communicate, for example, with the other components of the computing system 800 (e.g., via a communication network). The network interface 302E can include any suitable components for interfacing with one or more network(s), including for example, transmitters, receivers, ports, controllers, antennas, and/or other suitable components. One or more devices can be configured to receive one or more commands from the computing device(s) 302 or provide one or more commands to the computing device(s) 302.

Figure 6:
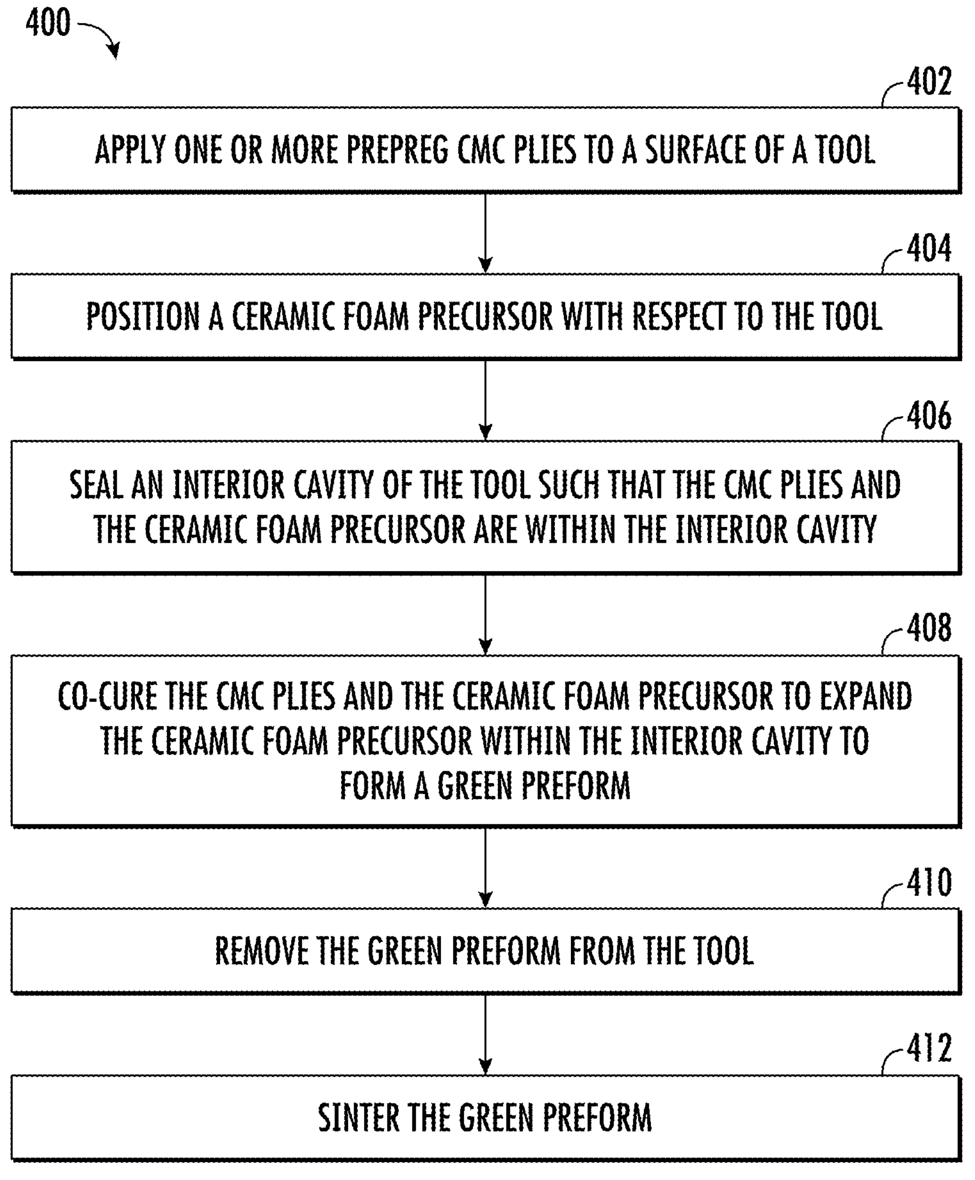
FIG. 6 is a block diagram depicting an embodiment of a method of forming a ceramic sandwich-structured composite component in accordance with various aspects of the present disclosure.

FIG. 6 provides a flow diagram of an exemplary method (400) for forming a ceramic sandwich-structured composite component in accordance with exemplary embodiments of the present disclosure. It should be appreciated that the method (400) is discussed herein only to describe exemplary aspects of the present subject matter and is not intended to be limiting.

At (402), the method (400) includes applying one or more prepreg CMC plies to one or more surfaces of a tool. At (404), the method (400) includes positioning a ceramic foam precursor with respect to the tool. At (406), the method (400) includes sealing an interior cavity of the tool such that the CMC plies and the ceramic foam precursor are within the interior cavity. At (408), the method (400) includes co-curing the CMC plies and the ceramic foam precursor to expand the ceramic foam precursor within the interior cavity to form a green preform. At (410), the method (400) includes removing the green preform from the tool. At (412), the method (400) includes sintering the green preform.

Further aspects are provided by the subject matter of the following clauses:

A method for forming a ceramic sandwich-structured composite component, the method comprising: applying one or more ceramic matrix composite (CMC) plies to at least a portion of at least one surface of a tool; positioning a ceramic foam precursor with respect to the tool such that the ceramic foam precursor is disposed in contact with or adjacent to the one or more CMC plies; forming a sealed interior cavity with respect to the tool, wherein the one or more CMC plies and the ceramic foam precursor are disposed within the sealed interior cavity; curing the ceramic foam precursor and the one or more CMC plies within the sealed interior cavity to form a green preform, the ceramic foam precursor configured to expand within the sealed interior cavity to apply a pressure to the one or more CMC plies to consolidate the one or more CMC plies, the expanded ceramic foam precursor forming a ceramic core of the green preform bonded to the one or more CMC plies; and sintering the green preform.

The method of the preceding clause, further comprising removing the green preform from the tool after the curing.

The method of any preceding clause, wherein applying the one or more CMC plies includes applying one or more prepreg CMC plies.

The method of any preceding clause, wherein forming the sealed interior cavity comprises closing the tool.

The method of any preceding clause, wherein curing the ceramic foam precursor and the one or more CMC plies comprises expanding the ceramic foam precursor by chemical reaction.

The method of any preceding clause, wherein curing the ceramic foam precursor and the one or more CMC plies comprises applying heat to the tool, the ceramic foam precursor and the one or more CMC plies.

The method of any preceding clause, further comprising applying a layer of ceramic adhesive layer to at least a portion of the one or more CMC plies before the curing.

The method of any preceding clause, further comprising positioning one or more mandrels to occupy at least a portion of the sealed interior cavity.

The method of any preceding clause, further comprising removing the one or mandrels from the green preform to form one or more cavities within the green preform.

The method of any preceding clause, further comprising selecting the ceramic foam precursor to have a coefficient of thermal expansion (CTE) parameter, after the curing, the same as or approximately the same as a CTE parameter of the one or more CMC plies.

The method of any preceding clause, further comprising selecting the ceramic foam precursor and the one or more CMC plies to have a difference in their respective CTE parameters of less than 1.1e-6 in/in/° F. in a green state.

The method of any preceding clause, further comprising selecting the ceramic foam precursor to have a defined density when expanded based on a geometry of the sealed interior cavity.

The method of any preceding clause, further comprising embedding one or more heating elements into one or more walls of the tool.

The method of any preceding clause, further comprising removing the one or more walls containing the one or more heating elements and replacing or re-positioning the one or more heating elements with respect to the interior cavity.

The method of any preceding clause, further comprising controlling at least one heating element of the one or more heating elements such that the at least one heating element emits a greater or lesser amount of thermal energy than another heating element of the one or more heating elements to provide a defined amount of thermal energy, or a defined thermal energy profile, to various portions of the tool and to the ceramic foam precursor.

A method for forming a ceramic sandwich-structured composite component, the method comprising: applying one or more ceramic matrix composite (CMC) plies to at least a portion of at least one surface of a tool, the tool closable to define an interior cavity, the one or more CMC plies disposed within the interior cavity when the tool is closed; positioning a ceramic foam precursor with respect to the tool such that the ceramic foam precursor is disposed within the interior cavity when the tool is closed; closing the tool to seal the interior cavity; co-curing the ceramic foam precursor and the one or more CMC plies within the interior cavity, the ceramic foam precursor expanding within the interior cavity during the co-curing to form a ceramic core bonded to the one or more CMC plies, wherein the ceramic core and the one or more CMC plies form, after the co-curing, a green preform; removing the green preform from the tool; and sintering the green preform.

The method of any preceding clause, wherein co-curing the ceramic foam precursor and the one or more CMC plies comprises expanding the ceramic foam precursor by chemical reaction of the ceramic foam precursor.

The method of any preceding clause, wherein co-curing the ceramic foam precursor and the one or more CMC plies comprises applying heat to the tool, the ceramic foam precursor and the one or more CMC plies.

The method of any preceding clause, further comprising positioning one or more mandrels to occupy at least a portion of the interior cavity to prevent expansion of the ceramic foam precursor into one or more volumes within the interior cavity.

The method of any preceding clause, further comprising selecting the ceramic foam precursor to exert a defined pressure against the one or more CMC plies when expanded.

The method of any preceding clause, further comprising inserting the tool into an oven, the oven providing thermal energy for the co-curing.

The method of any preceding clause, further comprising actuating one or more thermal energy systems to apply thermal energy to the tool.

A method for forming a ceramic sandwich-structured composite component, the method comprising: applying one or more ceramic matrix composite (CMC) plies to at least a portion of at least one surface of a tool, the tool closable to define an interior cavity, the one or more CMC plies disposed within the interior cavity when the tool is closed; positioning a ceramic foam precursor with respect to the tool such that the ceramic foam precursor is disposed within the interior cavity when the tool is closed; closing the tool to seal the interior cavity; actuating one or more thermal energy systems to apply thermal energy to the tool, the thermal energy causing the ceramic foam precursor to expand within the interior cavity, the ceramic foam precursor expanding to form a ceramic core bonded to the one or more CMC plies, wherein the ceramic core and the one or more CMC plies form a green preform; removing the green preform from the tool; and sintering the green preform.

The method of any preceding clause, wherein actuating the one or more thermal energy systems comprising flowing a heated fluid through one or more portions of the tool.

The method of any preceding clause, wherein actuating the one or more thermal energy systems comprising actuating one or more heating elements coupled to or embedded within the tool.

A system for forming a ceramic sandwich-structured composite component, the system comprising: a tool having one or more surfaces defining an interior cavity, the interior cavity configured to support a ceramic foam precursor and support one or more ceramic matrix composite (CMC) plies applied to the one or more surfaces, wherein the interior cavity is sealable; at least one thermal energy system actuatable by a controller to co-cure the ceramic foam precursor and the one or more CMC plies within the interior cavity to a green state to form a green preform, the ceramic foam precursor expanding within the interior cavity to apply a pressure to the one or more CMC plies to consolidate the one or more CMC plies; and a sintering unit configured to sinter the green preform.

The system of the preceding clause, wherein the tool includes one or more heating elements for distributing heat to the ceramic foam precursor and the one or more CMC plies.

The system of the preceding clause, wherein the tool includes one or more flow channels, and further comprising one of more fluid sources fluidically coupled to the one or more flow channels, the one or more fluid sources actuatable by the controller to distribute a fluid to the one or more flow channels to distribute thermal energy to the ceramic foam precursor and the one or more CMC plies.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a ceramic sandwich-structured composite component, the method comprising:

applying one or more ceramic matrix composite (CMC) plies to at least a portion of at least one surface of a tool;

positioning a ceramic foam precursor with respect to the tool such that the ceramic foam precursor is disposed in contact with or adjacent to the one or more CMC plies;

forming a sealed interior cavity with respect to the tool, wherein the one or more CMC plies and the ceramic foam precursor are disposed within the sealed interior cavity;

curing the ceramic foam precursor and the one or more CMC plies within the sealed interior cavity to form a green preform, the ceramic foam precursor configured to expand within the sealed interior cavity to apply a pressure to the one or more CMC plies to consolidate the one or more CMC plies, the expanded ceramic foam precursor forming a ceramic core of the green preform bonded to the one or more CMC plies; and sintering the green preform.

2. The method of claim 1, wherein forming the sealed interior cavity comprises closing the tool.

3. The method of claim 1, wherein curing the ceramic foam precursor and the one or more CMC plies comprises expanding the ceramic foam precursor by chemical reaction.

4. The method of claim 1, wherein curing the ceramic foam precursor and the one or more CMC plies comprises applying heat to the tool, the ceramic foam precursor and the one or more CMC plies.

5. The method of claim 1, further comprising applying a ceramic adhesive layer to at least a portion of the one or more CMC plies before the curing.

6. The method of claim 1, further comprising positioning one or more mandrels to occupy at least a portion of the sealed interior cavity.

7. The method of claim 6, further comprising removing the one or mandrels from the green preform to form one or more cavities within the green preform.

8. The method of claim 1, further comprising selecting the ceramic foam precursor to have a coefficient of thermal expansion (CTE) parameter after the curing the same as or approximately the same as a CTE parameter of the one or more CMC plies.

9. The method of claim 1, further comprising selecting the ceramic foam precursor to have a defined density when expanded based on a geometry of the sealed interior cavity.

10. A method for forming a ceramic sandwich-structured composite component, the method comprising:

applying one or more ceramic matrix composite (CMC) plies to at least a portion of at least one surface of a tool, the tool closable to define an interior cavity, the one or more CMC plies disposed within the interior cavity when the tool is closed;

positioning a ceramic foam precursor with respect to the tool such that the ceramic foam precursor is disposed within the interior cavity when the tool is closed;

closing the tool to seal the interior cavity;

co-curing the ceramic foam precursor and the one or more CMC plies within the interior cavity, the ceramic foam precursor expanding within the interior cavity during the co-curing to form a ceramic core bonded to the one or more CMC plies, wherein the ceramic core and the one or more CMC plies form, after the co-curing, a green preform;

removing the green preform from the tool; and sintering the green preform.

11. The method of claim 10, wherein co-curing the ceramic foam precursor and the one or more CMC plies comprises expanding the ceramic foam precursor by chemical reaction of the ceramic foam precursor.

12. The method of claim 10, wherein co-curing the ceramic foam precursor and the one or more CMC plies comprises applying heat to the tool, the ceramic foam precursor and the one or more CMC plies.

13. The method of claim 10, further comprising positioning one or more mandrels to occupy at least a portion of the interior cavity to prevent expansion of the ceramic foam precursor into one or more volumes within the interior cavity.

14. The method of claim 10, further comprising selecting the ceramic foam precursor to have a coefficient of thermal expansion (CTE) parameter, after the co-curing, the same as or approximately the same as a CTE parameter of the one or more CMC plies.

15. The method of claim 10, further comprising selecting the ceramic foam precursor to exert a defined pressure against the one or more CMC plies when expanded.

16. The method of claim 10, further comprising inserting the tool into an oven, the oven providing thermal energy for the co-curing.

17. The method of claim 10, further comprising actuating one or more thermal energy systems to apply thermal energy to the tool.

18. A system for forming a ceramic sandwich-structured composite component, the system comprising:

a tool having one or more surfaces defining an interior cavity, the interior cavity configured to support a ceramic foam precursor and support one or more ceramic matrix composite (CMC) plies applied to the one or more surfaces, wherein the interior cavity is sealable;

at least one thermal energy system actuatable by a controller to co-cure the ceramic foam precursor and the one or more CMC plies within the interior cavity to a green state to form a green preform, the ceramic foam precursor configured to expand within the interior cavity to apply a pressure to the one or more CMC plies to consolidate the one or more CMC plies; and a sintering unit configured to sinter the green preform.

19. The system of claim 18, wherein the tool includes one or more heating elements for distributing heat to the ceramic foam precursor and the one or more CMC plies.

20. The system of claim 18, wherein the tool includes one or more flow channels, and further comprising one or more fluid sources fluidically coupled to the one or more flow channels, the one or more fluid sources actuatable by the controller to distribute a fluid to the one or more flow channels to distribute thermal energy to the ceramic foam precursor and the one or more CMC plies.

* * * * *